United States Patent
Rauscher et al.

(10) Patent No.: US 12,465,989 B2
(45) Date of Patent: Nov. 11, 2025

(54) METHOD FOR PRODUCING WORKPIECE PARTS FROM A PLATE-SHAPED WORKPIECE, DATA PROCESSING PROGRAM AND PROCESSING MACHINE FOR PRODUCING THE WORKPIECE PARTS

(71) Applicant: TRUMPF Werkzeugmaschinen SE + Co. KG, Ditzingen (DE)

(72) Inventors: Steffen Rauscher, Dettingen unter Teck (DE); Florian Raichle, Backnang (DE); Dennis Wolf, Heimsheim (DE); Guido Schönhardt, Ditzingen (DE); Andreas Bunz, Leinfelden-Echterdingen (DE)

(73) Assignee: TRUMPF Werkzeugmaschinen SE + Co. KG, Ditzingen (DE)

( * ) Notice: Subject to any disclaimer, the term of this patent is extended or adjusted under 35 U.S.C. 154(b) by 436 days.

(21) Appl. No.: 17/993,156

(22) Filed: Nov. 23, 2022

(65) Prior Publication Data
US 2023/0201946 A1  Jun. 29, 2023

Related U.S. Application Data

(63) Continuation of application No. PCT/EP2021/064355, filed on May 28, 2021.

(30) Foreign Application Priority Data

May 28, 2020 (EP) .................................... 20177122

(51) Int. Cl.
*B23K 7/00* (2006.01)
*B23K 26/08* (2014.01)
(Continued)

(52) U.S. Cl.
CPC .............. *B23K 7/003* (2013.01); *B23K 26/08* (2013.01); *B23K 26/38* (2013.01);
(Continued)

(58) Field of Classification Search
CPC ........ B23K 10/00; B23K 15/02; B23K 15/08; B23K 2101/18; B23K 26/08;
(Continued)

(56) References Cited

U.S. PATENT DOCUMENTS 6,090,330 A   7/2000  Gawa et al.
8,618,433 B2  12/2013 Heusel
(Continued)

FOREIGN PATENT DOCUMENTS

DE   102011051170 A1   12/2012
DE   102015217015 B3   12/2016
(Continued)

*Primary Examiner* — Nicholas A Wang
(74) *Attorney, Agent, or Firm* — Laurence A. Greenberg; Werner H. Stemer; Ralph E. Locher

(57) ABSTRACT

A method for producing workpiece parts from a plate-shaped workpiece in a processing machine or laser processing machine includes positioning and holding the workpiece on a workpiece support by clamping devices. A plurality of workpiece parts are cut out of the workpiece with a process beam. The process beam is moved relative to the workpiece support by a processing head and/or the workpiece is moved relative to the workpiece support by the clamping devices. A cutting process for processing the workpiece to produce the workpiece parts is interrupted at least once by a relaxation step for the workpiece. During the relaxation step at least one clamping device is released to relax the workpiece. The at least one clamping device is closed following the relaxation and before continuing the cutting process. A data processing program and a processing machine for producing the workpiece parts are also provided.

10 Claims, 3 Drawing Sheets

(51) Int. Cl.
*B23K 26/38* (2014.01)
*B23K 37/04* (2006.01)
*B23K 101/18* (2006.01)

(52) U.S. Cl.
CPC ...... *B23K 37/0408* (2013.01); *B23K 37/0435* (2013.01); *B23K 2101/18* (2018.08)

(58) Field of Classification Search
CPC .. B23K 26/083; B23K 26/0876; B23K 26/38; B23K 31/003; B23K 37/0235; B23K 37/0408; B23K 37/0435; B23K 7/003; B23K 7/10; B23K 9/013; B23K 9/32
See application file for complete search history.

(56) References Cited

U.S. PATENT DOCUMENTS

| | | |
|---|---|---|
| 10,220,475 B2 | 3/2019 | Schmauder et al. |
| 2002/0100308 A1* | 8/2002 | Wegener ............ B23K 26/0093 72/295 |
| 2019/0308275 A1 | 10/2019 | Seitz |

FOREIGN PATENT DOCUMENTS

| | | |
|---|---|---|
| EP | 2008736 A1 | 12/2008 |
| GB | 708509 A | 5/1954 |
| JP | H10146671 A | 6/1998 |
| JP | 2005319969 A | 11/2005 |
| JP | 2017501886 A | 1/2017 |
| WO | 2015091347 A1 | 6/2015 |
| WO | 2016088494 A1 | 6/2016 |

* cited by examiner

METHOD FOR PRODUCING WORKPIECE PARTS FROM A PLATE-SHAPED WORKPIECE, DATA PROCESSING PROGRAM AND PROCESSING MACHINE FOR PRODUCING THE WORKPIECE PARTS

CROSS-REFERENCE TO RELATED APPLICATION

This application is a continuation, under 35 U.S.C. § 120, of copending International Patent Application PCT/EP2021/064355, filed May 28, 2021, which designated the United States; this application also claims the priority, under 35 U.S.C. § 119, of European Patent Application EP 20177122.7, filed May 28, 2020; the prior applications are herewith incorporated by reference in their entirety.

FIELD AND BACKGROUND OF THE INVENTION

The invention relates to a method for producing workpiece parts from a plate-shaped workpiece in a processing machine, a data processing program for a controller of a processing machine, and a processing machine for producing workpiece parts from a plate-shaped workpiece.

International Publication WO 2015/091347 A, corresponding to U.S. Pat. No. 10,220,475, discloses a processing machine, in particular a laser cutting machine. That processing machine includes a workpiece support and a plurality of clamping claws for gripping a plate-shaped workpiece positioned on the workpiece support. Furthermore, a beam source for producing a process beam is provided. The process beam is directed by a processing head onto the plate-shaped workpiece in order to cut workpiece parts out of the plate-shaped workpiece. A laser beam is preferably used for producing the workpiece parts. In the case of that processing machine, provision is made for the plate-shaped workpiece to be movable on the workpiece support along an X axis and for the processing head to be movable above the workpiece support along a Y axis with respect to the workpiece support.

European Application EP 2 008 736 A1, corresponding to U.S. Pat. No. 8,618,433, discloses a further processing machine for producing workpiece parts, for cutting and/or punching them out of the plate-shaped workpiece. A different machine concept is provided in that processing machine. The processing head for emitting the process beam is stationary, and the plate-shaped workpiece is moved in the X and/or Y direction along the workpiece support by the clamping device.

Alternatively, a machine concept is also known in which the plate-shaped workpiece is held resting on the workpiece support and the processing head is movable along relative thereto above the workpiece support in an X and Y axis.

During processing of the plate-shaped workpiece in order to produce the workpiece parts with a process beam, in particular a laser beam, distortions in the plate-shaped workpiece may occur due to the heat input by the cutting process. That may result in the plate-shaped workpiece curling. That may lead in turn to the workpiece part which is to be cut abruptly snapping upward or downward during the cutting process in such a way that a so-called incomplete cutting action occurs. That means that the workpiece part is not completely separated from the plate-shaped workpiece or from the sheet skeleton and can no longer be removed from the plate-shaped workpiece. Even without such an incomplete cutting action, distortions of the plate-shaped workpiece may occur because the cut workpiece part cannot be removed from the plate-shaped workpiece.

German Patent DE 10 2015 217 015 B1, corresponding to U.S. Publication No. 2019/0308275, discloses a laser cutting apparatus for producing a sheet metal blank by using a laser beam. The laser cutting apparatus is fed a metal sheet from a coil, the metal sheet being distorted in a manner free from stress by using a stretching device. The stretched metal sheet, in which a tensile stress is applied in such a way that the yield point of a metal forming the metal sheet is exceeded, is then fed to the laser cutting apparatus in order to cut the sheet metal blank. A stretched metal sheet is therefore fed to the cutting process. During the cutting process, the metal sheet is held by at most one of the clamping devices or, during the cutting of the metal sheet, the clamping connection of the clamping devices is even released.

However, for the dimensionally stable production of workpiece parts from plate-shaped workpieces, the plate-shaped workpiece has to be clamped so that rotation of the plate-shaped workpiece in the resting plane on a workpiece support of the processing machine is prevented.

SUMMARY OF THE INVENTION

It is accordingly an object of the invention to provide a method for producing workpiece parts from a plate-shaped workpiece, a data processing program and a processing machine for producing the workpiece parts, which overcome the hereinafore-mentioned disadvantages of the heretofore-known methods, programs and machines of this general type and which reduce distortions produced by inputting heat into the plate-shaped workpiece.

With the foregoing and other objects in view there is provided, in accordance with the invention, a method for producing workpiece parts from a plate-shaped workpiece, in which a cutting process for processing the plate-shaped workpiece to produce the workpiece parts is interrupted at least once by a relaxation step, and in which, during the relaxation step, at least one clamping device is released in order to relax the plate-shaped workpiece and, following the relaxation of the plate-shaped workpiece and before the cutting process is continued, the at least one released clamping device is closed again. This method makes it possible for the productivity of the processing machine to be reduced only to a small extent, specifically by the brief interruption to the cutting process in order to carry out the at least one relaxation step. However, this makes it possible for distortion of the plate-shaped workpiece due to heat being input by the cutting beam, in particular a laser beam, the heat input having an especially negative effect on the cutting accuracy and/or process reliability, to be able to be reduced or eliminated. High dimensional accuracy in the production of the workpiece parts can thereby also be obtained. In addition, it was determined that an incomplete cutting action during the cutting of workpiece parts, in particular relatively large workpiece parts, can be avoided.

In principle, it is advantageous to keep the interruption to the cutting process caused by a relaxation step as small as possible. The time needed by a relaxation step crucially depends on the time required for releasing and closing a clamping device. When pneumatic or hydraulic clamping devices are used, the minimum time needed for a relaxation step is limited, for example, by the time required for the respective relieving of load and subsequent loading of the clamping devices with a certain clamping pressure. The time required for releasing or opening (e.g. dropping below a lower clamping pressure threshold) and subsequent complete closing (e.g. reaching a required clamping pressure) of a clamping device can be less than 5 seconds, preferably less than 3 seconds.

Provision is preferably made for the number of relaxation steps during the cutting process for processing the plate-shaped workpiece to be activated according to the number of workpiece parts to be produced from the plate-shaped workpiece, the material thickness of the plate-shaped workpiece, the size of the workpiece parts and/or laser power for the process beam. As a result, the productivity of the processing machine can be optimized taking into consideration these parameters.

In practice, the number of relaxation steps during the cutting of workpiece parts out of a plate-shaped workpiece, and the time of each relaxation step during the processing process can be determined, for example, on the basis of a visual assessment by a machine operator. The workpiece may be deformed by heat-induced distortions. As soon as the operator perceives a critical deformation (e.g. a critical curvature) of the plate-shaped workpiece, they can determine that a relaxation step is being carried out promptly, for example before the next step is carried out. In this way, a certain number of relaxation steps is produced during the processing of the entire plate-shaped workpiece. The number and times of the relaxation steps can then be stored and pre-programmed for subsequent identical processing processes in such a way that the operator no longer has to intervene in the process.

Alternatively, the processing process can also be monitored by a corresponding sensor arrangement which detects deformations of the workpiece as the workpiece parts are being cut out. If the deformation exceeds a predetermined critical value (e.g. curvature of the workpiece by a certain amount), a relaxation step is automatically carried out at the next possible time or at another suitable time.

A critical curvature of the workpiece may cause the distance between workpiece and cutting head to be changed locally in such a manner that the laser beam no longer completely severs the workpiece in this region and an incomplete cutting action occurs. A collision may also occur between curved workpiece and cutting head.

Advantageously, the cutting process is interrupted after a workpiece part is completely cut and before the beginning of the next cutting step for cutting the subsequent workpiece part. The relaxation step is therefore carried out between two consecutive cutting steps. High dimensional accuracy of the cut workpiece parts can thereby be obtained in turn.

When carrying out the relaxation step, provision is preferably made for the plate-shaped workpiece to be held along a side edge by a plurality of clamping devices, and, for the relaxation of a partial region of the plate-shaped workpiece, for the clamping devices to be released one after another from the outside inward, wherein at least two of the plurality of clamping devices which fixedly hold the plate-shaped workpiece remain closed, and, subsequently, following the relaxation of the partial region of the plate-shaped workpiece, the clamping devices are closed again from the inside outward. Subsequently, this operation can be repeated beginning from the opposite side of the plate-shaped workpiece for relaxation of the further partial region of the plate-shaped workpiece. It is therefore possible for a relaxation to be undertaken from each face side of the plate-shaped workpiece. At the same time, the plate-shaped workpiece is always held by at least two clamping devices during the relaxation step. This leads to high dimensional stability since the plate-shaped workpiece can thereby neither be displaced nor rotated relative to the clamping devices.

If the plate-shaped workpiece is held along a side edge by three clamping devices for example, for the relaxation of the plate-shaped workpiece the one outer clamping device can be opened and closed and, subsequently, the opposite outer clamping device can be opened and closed. The central clamping device therefore remains permanently in a clamping position, with one of the two outer clamping devices alternatively additionally also keeping the workpiece fixed.

According to a further preferred embodiment of the method, provision is made for the plate-shaped workpiece to be held along a side edge by four or more clamping devices, and, for the relaxation of the plate-shaped workpiece, for first of all the outer clamping device on one half of the plate-shaped workpiece to be opened, followed by at least one inner clamping device adjacent thereto, and subsequently to be closed again in reverse, while the two further clamping devices or the clamping devices on the other half of the plate-shaped workpiece remain closed. This operation is then repeated on the opposite half of the workpiece. As a result, the opening of the clamping devices from the outside inward and the closing of the clamping devices from the inside outward is activated. An optimum relaxation can be obtained.

For example, the outer clamping devices can each be opened for approximately 2.5 seconds. While the respective outer clamping device is open, the inner clamping device in each case can be opened for approximately 1 second. From the beginning of the opening of the first clamping device until the complete closure (e.g. reaching of a predefined clamping pressure) of the second outer clamping device, such a relaxation operation with four clamping devices can take approximately 6 seconds.

The number of relaxation steps can be activated according to the material thickness. Advantageously, the number of relaxation steps during the processing of the plate-shaped workpiece of 4 mm or less is greater than in the event of a material thickness of the plate-shaped material which is greater than 4 mm. In the event of a greater material thickness of the plate-shaped material, a smaller deformation occurs when heat is input. As a result, the number of relaxation steps can be reduced.

Furthermore, it is preferably provided that, in the case of workpiece parts which have an edge length of greater than 500 mm and/or an elongate shape, in which the ratio of the edge length of the surrounding rectangle to one another is greater than 2:1, a relaxation step is carried out before the cutting step for producing the workpiece part. Alternatively or additionally, a relaxation step can also be carried out after the cutting step for producing the workpiece part. Before the cutting of an elongate workpiece, it is advantageous to reduce distortions in the workpiece since a deformation of the workpiece has a particularly negative effect during the cutting of elongate workpiece parts. In addition, the extended processing period for producing such elongate workpiece parts results in an increased input of heat which may lead to distortions which are worth reducing by using a relaxation step.

In a further advantageous embodiment of the method, the workpiece parts to be produced from the plate-shaped workpiece are nested in rows and columns, and, during the cutting process of workpiece parts that form a row adjacent to the clamping devices, at least one relaxation step is activated following the final cutting of at least two workpiece parts.

A further preferred refinement of the method makes provision for the process of cutting workpiece parts which lie in a half remote from the clamping devices, preferably in a remote third of the plate-shaped workpiece, to be carried out without a relaxation step when the plate-shaped workpiece is fixed by the clamping device along a side edge. It has turned out that a high degree of cutting accuracy and process reliability are made possible in these regions remote from the clamping devices, even without relaxation steps, whereas, in the case of workpieces which lie closer to the clamping devices, one or more relaxation steps are required.

With the objects of the invention in view, there is also provided a data processing program for a controller of a processing machine, which controller activates the machine for carrying out the method according to one of the previously described embodiments.

As a result, the processing of the plate-shaped workpiece for producing a plurality of workpiece parts can be carried out automatically by the processing machine. Additionally or alternatively, even after the cutting of the number of workpiece parts defined in the data processing program, there may be a request to the operator to carry out the relaxation step. The operator can decide whether the relaxation step should be carried out or whether it is not yet necessary at this time. A process step can additionally also be provided in the data processing program that the operator can set, in the machine controller, the number of workpiece parts, after which a relaxation step is carried out, in particular if the cutting involves highly complex workpiece parts, in which the number of relaxation steps provided by the data processing program does not appear to be sufficient.

With the objects of the invention in view, there is concomitantly provided a processing machine for producing workpiece parts from a plate-shaped material, in particular a laser cutting machine, in which the workpiece parts can be produced from the plate-shaped workpiece in accordance with one of the previously described method steps.

Other features which are considered as characteristic for the invention are set forth in the appended claims.

Although the invention is illustrated and described herein as embodied in a method for producing workpiece parts from a plate-shaped workpiece, a data processing program and a processing machine for producing the workpiece parts, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
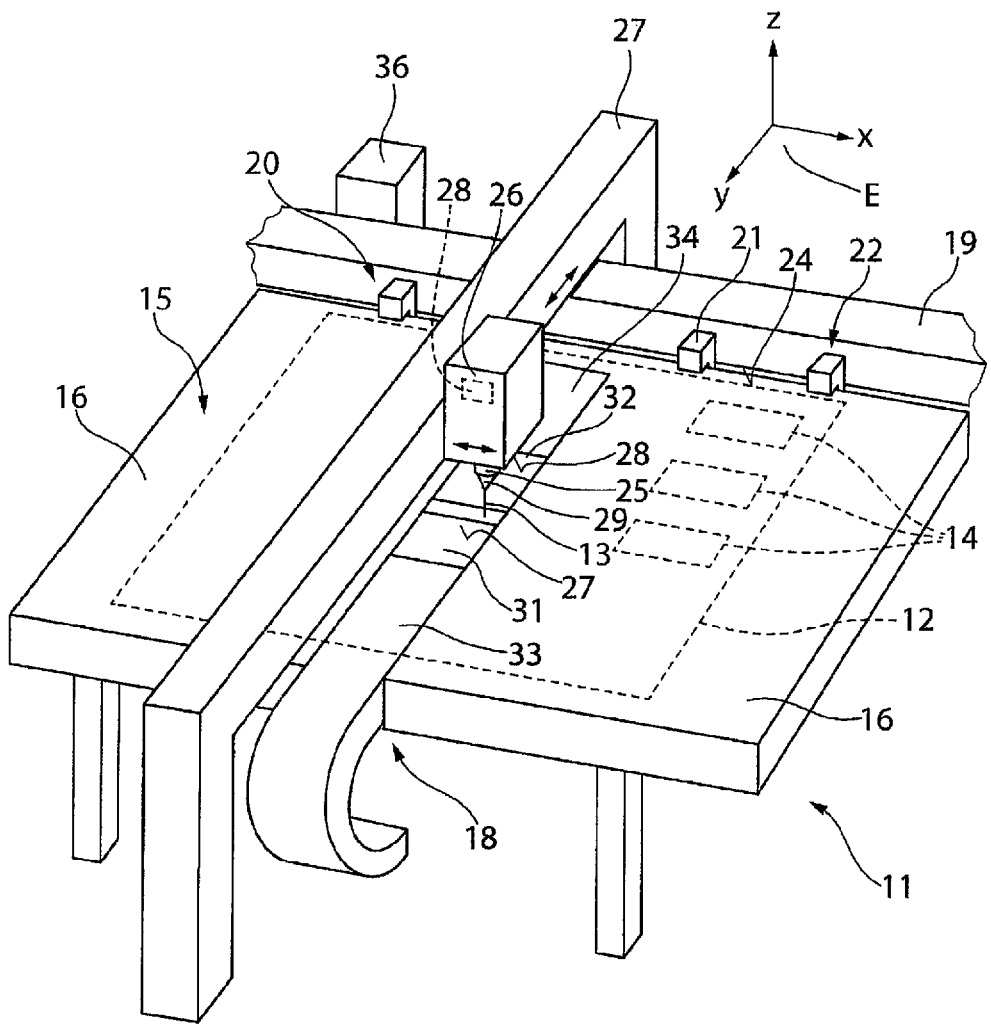
FIG. 1 is a diagrammatic, perspective view of a processing machine for producing workpiece parts from a plate-shaped workpiece.

Referring now to the figures of the drawings in detail and first, particularly, to FIG. 1 thereof, there is seen a processing machine 11 for producing workpiece parts 14 from a plate-shaped workpiece 12. The workpiece parts 14 are produced from the plate-shaped workpiece 12 by a separating processing operation, in particular by using a process beam 13. The processing machine can be in the form of a laser processing machine for laser cutting of workpiece parts 14 with a laser beam as the process beam 13. For the cutting processing of the workpiece parts 14, the process beam 13 may also be a plasma beam.

During the processing, the plate-shaped workpiece 12 rests on a workpiece support 15 which is formed, for example, from two workpiece support surfaces 16 which are disposed adjacent to each other and which are spaced apart, with a gap 18 being formed. The workpiece support 15 includes a rest plane E which corresponds to an XY plane of the XYZ coordinates system illustrated in FIG. 1.

A plurality of clamping devices 20, 21, 22, 23 are activated by using a handling device 19, which includes a drive, not illustrated specifically. Through the use of the clamping devices 20, 21, 22, 23, the plate-shaped workpiece 12 can be displaced on the workpiece support 15 in a movement direction X and moved to a predefined processing position. The clamping devices 20, 21, 22, 23 are preferably configured as clamping claws which engage along a side edge 24 of the plate-shaped workpiece 12. Alternatively, it can also be provided that, in order to move or assist the movement of the plate-shaped workpiece 12 in the X direction, the workpiece support 15 itself is configured as a moving device, for example in the form of one or more revolving conveyor belts, as is described in German Application DE 10 2011 051 170 A1 by the Applicant pf the instant application.

The gap 18 lying between the workpiece support surfaces 16 of the workpiece support 15 extends in the Y direction preferably over the entire movement path of a processing head 25 which aligns and focuses the process beam 13 with and on the plate-shaped workpiece 12. The processing head 25 is guided by a driven carriage 26, which serves as the moving device, on a stationary gantry 27. The processing head 25 is activated so as to be movable in the Y direction above the gap 18. In the example illustrated, the processing head 25 can additionally also be movable in a controlled manner in the X direction within the gap 18. For this purpose, the carriage 26 can be moved in a controlled manner in the X direction by an additional moving device 28, for example in the form of a linear drive. With the aid of the moving devices 26, 28, which build on each other, the processing head 25 can be positioned both in the X direction and in the Y direction in a desired cutting position within the gap 18. The processing head 25 can optionally also be displaced along a third movement direction (Z direction) in order to adjust the distance between a processing nozzle 29 of the processing head 25 and the workpiece surface.

Disposed within the gap 18 are two support carriages 31, 32 which each extend over the width of the gap 18 and are movable in the gap in a controlled manner in the Y direction and also independently of each other. A respective covering element 33, 34, through the use of which the gap 18 is closed, is provided at the respective ends of the support carriages 31, 32 remote from the process beam 13. The process beam 13 is produced by a beam source 36, in particular a laser source, and fed by using a beam guide, not illustrated specifically, to the processing head 25 and output by the latter.

Figure 2:
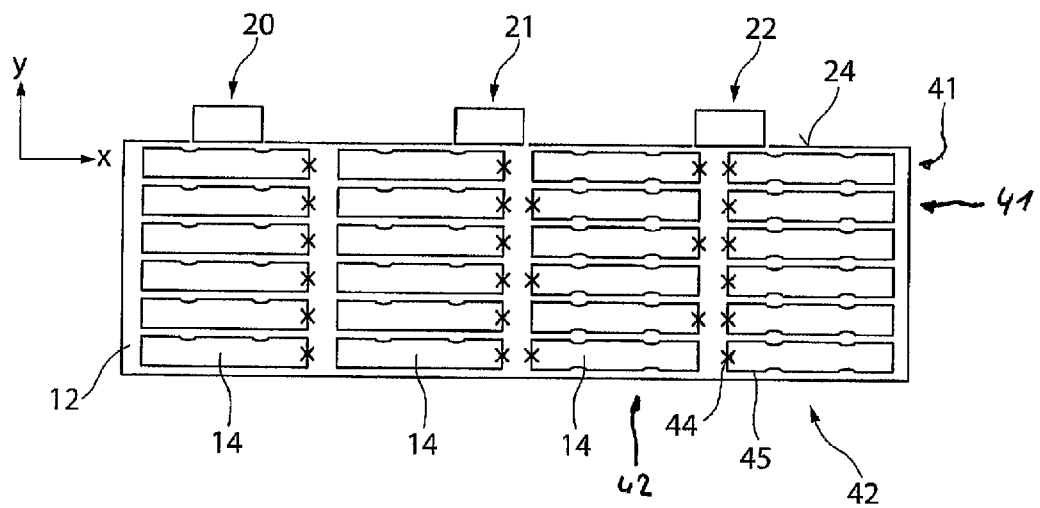
FIG. 2 is an elevational view of a plate-shaped workpiece with clamping devices for describing a relaxation step.

During the processing of the plate-shaped workpiece 12 which is held by the clamping device 20, 21, 22, 23 and which rests on the workpiece support 15, the following processing operations, for example, are carried out in order to avoid distortions occurring in the plate-shaped workpiece 12:

A first embodiment of the method for producing workpiece parts 14 from the plate-shaped workpiece 12 by a separating processing operation is described in more detail with reference to FIG. 2.

The plate-shaped workpiece 12 has an elongate rectangular geometry. Along one side edge 24, in particular the longer side edge of the plate-shaped workpiece 12, the plate-shaped workpiece 12 is held, for example, by three clamping devices 20, 21, 22. The engagement of three clamping devices 20, 21, 22 takes place in the case of smaller plate-shaped workpieces 12, for example up to a length of the side edge 24 of 2400 mm. The workpiece parts 14 are, for example, nested in six rows 41 and four columns 42. Starting from a starting point 44, the workpiece parts 14 are cut in the clockwise direction or in the counterclockwise direction and a cutting gap 45 is introduced by the process beam 13 until the process beam 13 again reaches the starting point 44. At the starting point 44, a microjoint which connects the workpiece part 14 to the plate-shaped workpiece 12 can be formed. The workpiece 14 can also be completely separated from the plate-shaped workpiece 12.

During a cutting process for processing the plate-shaped workpiece 12, one or more workpiece parts 14 are cut with the process beam 13. In order to reduce the distortions produced by heat being input into the plate-shaped workpiece 12, a relaxation step is carried out at least once during the cutting process for processing the workpiece between two cutting steps for cutting workpiece parts. The sequence of such a relaxation step is described below.

For example, first of all the first, or outer, clamping device 20 can be opened so that the partial region of the plate-shaped workpiece 12 which is assigned to the clamping device 20 can relax. The two further clamping devices 21, 22 remain closed in order to maintain the position and orientation of the plate-shaped workpiece 12. After the one partial region of the plate-shaped workpiece 12 which is assigned to the first clamping device 20 has relaxed, this clamping device 20 is closed. Subsequently, the third, or outer, clamping device 22 which is provided on the opposite side of the plate-shaped workpiece 12 is opened. After the partial region of the plate-shaped workpiece 12 which is assigned to the third clamping device 22 has relaxed, the clamping device 22 is closed again. The relaxation step in the case of, for example, three clamping devices 20, 21, 22 for the plate-shaped workpiece 12 is then finished. In this relaxation step, the central clamping device 21 remains permanently closed.

Such a relaxation step can be carried out, for example, whenever one or more workpiece parts 14 in the first and/or in the second and/or in the third row 41 are processed. A relaxation step can also take place whenever the workpiece parts 14 are produced in columns 42. When the workpiece parts 14 are produced along a column 42, the number of relaxation steps is increasingly increased as the workpiece parts 14 get increasingly closer to the clamping device 20, 21, 22.

Figure 3:
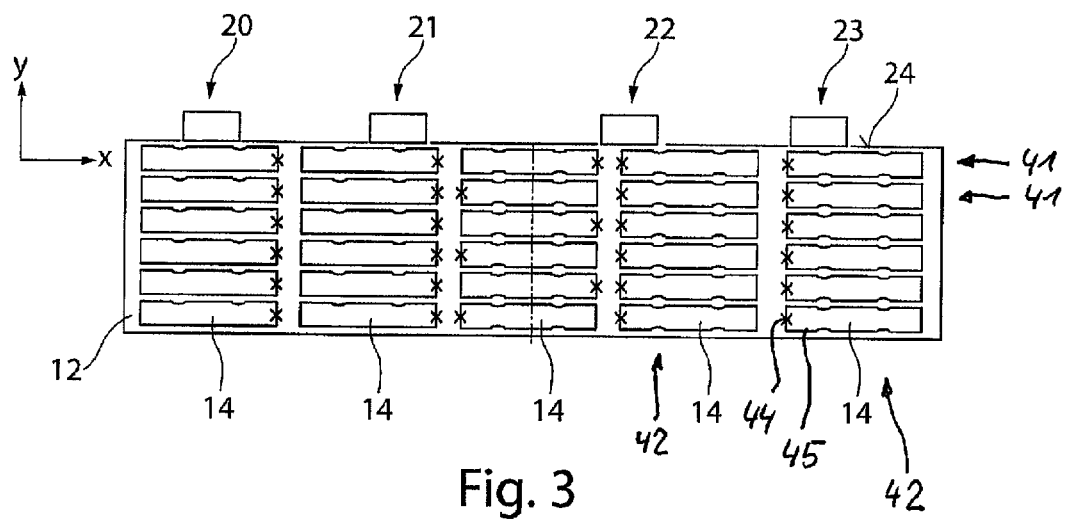
FIG. 3 is an elevational view of the plate-shaped workpiece with an alternative number of clamping devices for illustrating a relaxation step.

FIG. 3 illustrates a diagrammatic view of a plate-shaped workpiece 12 which has a length of the side edge 24 of, for example, greater than 2400 mm. In this case, at least four clamping devices 20, 21, 22, 23 engage on the side edge 24. When the plate-shaped workpiece 12 is of such a size, the relaxation step takes place, for example, as follows:

The clamping devices 20, 21, 22, 23 clamp the plate-shaped workpiece 12 during the production of the at least one workpiece part 14. After the one workpiece part 14 is completely cut, the relaxation step is initiated before the at least one next workpiece part 14 is cut. First of all, an outermost clamping device, for example the clamping device 23, is opened. The adjacent inner clamping device 22 is then opened. As a result, the partial region of the plate-shaped workpiece 12 that is assigned to the clamping devices 22, 23 can be relaxed. The opened clamping devices 22, 23 are then closed from the inside outward, i.e. first of all the inner clamping device 22, followed by the outer clamping device 23. As a result, for example, a right half of the plate-shaped workpiece 12 is relaxed. The clamping devices 20, 21 remain closed during the first phase of the previously described relaxation step.

This sequence is subsequently carried out for the left half of the plate-shaped workpiece 12, i.e. first of all the clamping device 20 is opened, followed by the clamping device 21, while the clamping devices 22 and 23 remain closed. Subsequently, the clamping device 21 and finally the clamping device 20 are closed again. A second phase of the relaxation step and therefore the entire relaxation step are then finished.

An analogous procedure for carrying out the relaxation step is also provided whenever, for example, five, six or more clamping devices engage on a side edge 24 of the plate-shaped workpiece 12. The consecutive opening of the clamping devices from the outer edge toward the center takes place to the extent that at least two clamping devices are always kept closed during the relaxation step.

Figure 4:
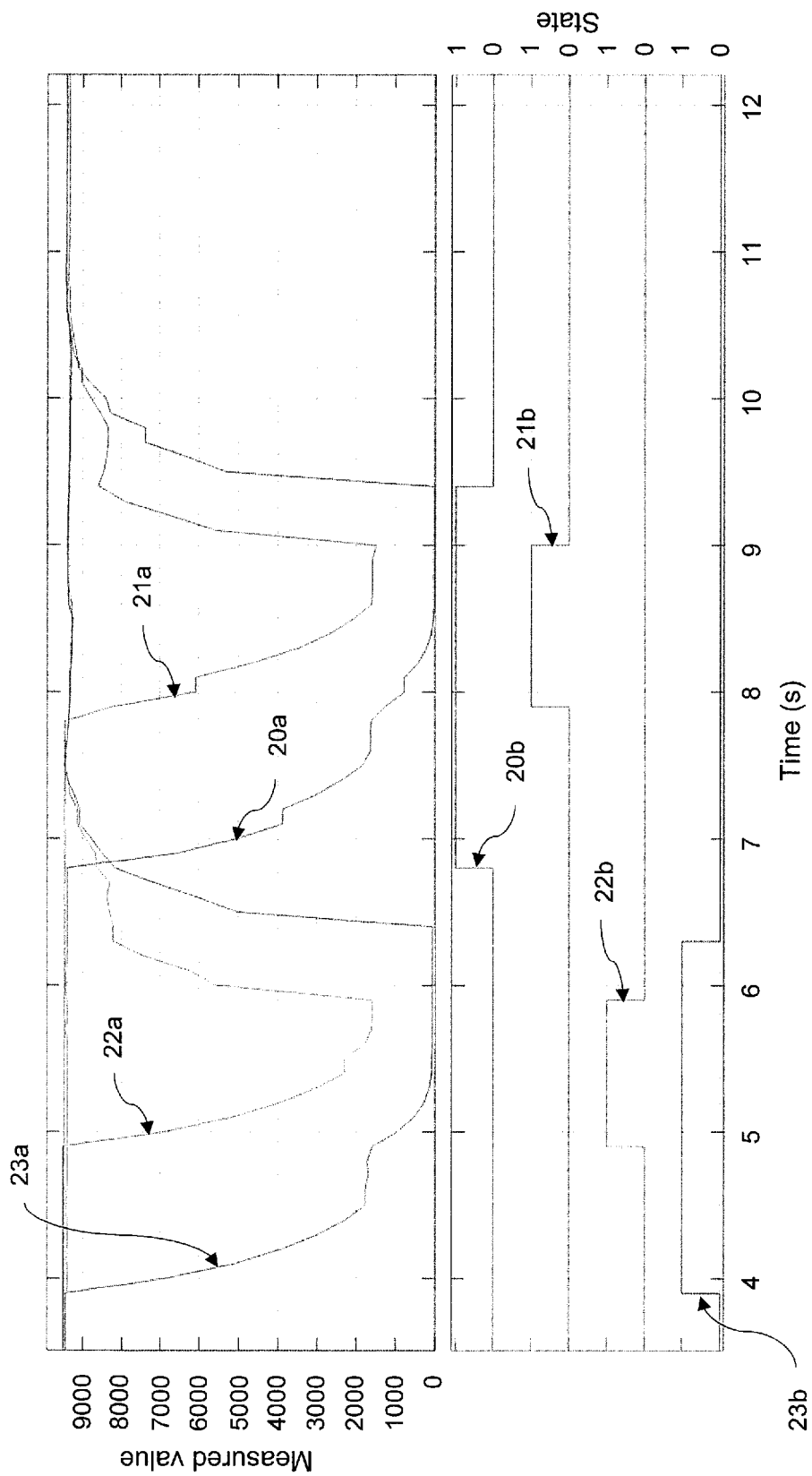
FIG. 4 is a diagram illustrating an exemplary time sequence of a relaxation step according to the variant illustrated in FIG. 3.

FIG. 4 shows the time sequence of opening (or releasing) and of closing the clamping devices 20, 21, 22, 23 during a relaxation step according to the variant described in conjunction with FIG. 3. In the top half of the illustration, the clamping pressure profile (in hPa) is depicted over the duration of the relaxation step (time in s) for each clamping device 20, 21, 22, 23. In the bottom half, the sensor signals 20*b*, 21*b*, 22*b*, 23*b* corresponding to the respective pressure curves 20*a*, 21*a*, 22*a*, 23*a* are depicted (the value "0" indicates the closed (desired) state and the value "1" indicates the opened (desired) state of the respective clamping device 20, 21, 22, 23).

If the clamping pressure is reduced below a predetermined value (5000 hPa in the example illustrated), the respective clamping device can be considered to be opened or released. In order to release distortions in a clamped plate-shaped workpiece, it is therefore not necessarily required for all of the clamping devices 20, 21, 22, 23 to be completely released (i.e. clamping pressure=0) (in the example, the clamping pressure of the inner clamping devices 21 and 22 is in each case not reduced to 0).

The second phase of the relaxation step can be initiated as soon as the clamping pressure of the clamping devices 22, 23 from the first phase lies above a minimum clamping pressure (e.g. 5000 hPa). Since the plate-shaped workpiece 12 is not moved during the relaxation step, a lower clamping pressure than during the cutting operation is already sufficient to securely fix the workpiece 12.

The relaxation step is finished if the clamping pressure of each of the clamping devices 20, 21, 22, 23 has again reached the desired value necessary for the operation (9300 hPa in the example).

The invention claimed is:

1. A method for producing workpiece parts from a workpiece in a processing machine or a laser processing machine, the method comprising:
   positioning the workpiece on a workpiece support and using a plurality of clamping devices to hold the workpiece along a side edge of the workpiece relative to the workpiece support;
   using a process beam to cut a plurality of workpiece parts out of the workpiece;
   at least one of using a processing head to move the process beam relative to the workpiece support or using the clamping devices to move the workpiece relative to the workpiece support;
   interrupting a cutting process for processing the workpiece to produce the workpiece parts at least once by a relaxation step for the workpiece;
   during the relaxation step, releasing the clamping devices along the side edge one after another from an outside of the machine inward, for a relaxation of a partial region of the workpiece and, following the relaxation of the workpiece and before continuing the cutting process, closing the clamping devices; and
   keeping at least two of the plurality of clamping devices closed for fixedly holding the workpiece, and subsequently, following the relaxation of the partial region of the workpiece, closing the opened clamping devices again from an inside outward.

2. The method according to claim 1, which further comprises activating a number of relaxation steps during the cutting process for processing the workpiece according to at least one of a number of workpiece parts to be produced from the workpiece, a material thickness of the workpiece, a size of the workpiece parts or a power of the process beam.

3. The method according to claim 1, which further comprises interrupting the cutting process for the relaxation step after a cutting step for completely cutting a workpiece part and before a beginning of a next cutting step for cutting a subsequent workpiece part.

4. The method according to claim 1, which further comprises using three of the clamping devices to hold the workpiece along a side edge, and, for the relaxation of the workpiece, first of all opening and closing one outer clamping device relative to the machine and subsequently opening and closing an opposite outer clamping device relative to the machine.

5. The method according to claim 1, which further comprises:
   using four or more clamping devices to hold the workpiece along a side edge, and, for the relaxation of the workpiece, first of all opening an outer clamping device relative to the machine in one half of the workpiece, followed by at least one inner clamping device relative to the machine adjacent the outer clamping device relative to the machine;
   keeping two further clamping devices or the clamping devices from another half of the workpiece opposite to the opened clamping devices closed; and
   subsequently, first of all closing an inner clamping device relative to the machine and then a clamping device further outward relative to the machine, and repeating closing of an inner clamping device relative to the machine and then a further outer clamping device relative to the machine on an opposite side of the workpiece.

6. The method according to claim 1, which further comprises carrying out a greater number of relaxation steps for a material thickness of the workpiece of 4 mm or less, than for a material thickness of the workpiece of 4 mm or more.

7. The method according to claim 1, which further comprises carrying out a relaxation step at least one of before or after cutting a workpiece part having at least one of an edge length of greater than 500 mm or an elongate shape having a ratio of edge lengths of an imaginary rectangle surrounding the workpiece to each other of greater than 2:1.

8. A method for producing workpiece parts from a workpiece in a processing machine or a laser processing machine, the method comprising:
   positioning the workpiece on a workpiece support and using clamping devices to hold the workpiece relative to the workpiece support;
   using a process beam to cut a plurality of workpiece parts out of the workpiece;
   at least one of using a processing head to move the process beam relative to the workpiece support or using the clamping devices to move the workpiece relative to the workpiece support;
   interrupting a cutting process for processing the workpiece to produce the workpiece parts at least once by a relaxation step for the workpiece;
   during the relaxation step, releasing at least one clamping device in order to relax the workpiece and, following the relaxation of the workpiece and before continuing the cutting process, closing the at least one clamping device; and
   nesting the workpiece parts to be produced from the workpiece in rows and columns, and during the cutting of workpiece parts forming a row adjacent the clamping devices, activating at least one relaxation step following a final cutting of at least two workpiece parts.

9. A method for producing workpiece parts from a workpiece in a processing machine or a laser processing machine, the method comprising:
   positioning the workpiece on a workpiece support and using clamping devices to hold the workpiece relative to the workpiece support;
   using a process beam to cut a plurality of workpiece parts out of the workpiece;
   at least one of using a processing head to move the process beam relative to the workpiece support or using the clamping devices to move the workpiece relative to the workpiece support;
   interrupting a cutting process for processing the workpiece to produce the workpiece parts at least once by a relaxation step for the workpiece;
   during the relaxation step, releasing at least one clamping device in order to relax the workpiece and, following the relaxation of the workpiece and before continuing the cutting process, closing the at least one clamping device;
   using the clamping devices to hold the workpiece along a side edge; and
   cutting the workpiece parts lying in a half or a third of the workpiece remote from the clamping devices without a relaxation step.

10. A non-transitory data processing program for a machine controller of a processing machine or a laser cutting machine having a workpiece support, clamping devices for gripping a workpiece positioned on the workpiece support, and a beam source for producing a process beam directed onto the workpiece by a processing head;

the data processing program having instructions stored thereon, that when executed on a processor, activate the processing machine or laser cutting machine to perform the method according to claim 1.

* * * * *